United States Patent [19]

Steiner

[11] 4,384,630
[45] May 24, 1983

[54] SYSTEM TO INCREASE VEHICLE FUEL EFFICIENCY

[76] Inventor: Karl Steiner, 2719 Country La., Erie, Pa. 16506

[21] Appl. No.: 203,053

[22] Filed: Nov. 3, 1980

[51] Int. Cl.³ .................... B60K 25/00; B62D 35/00
[52] U.S. Cl. .................................... 180/7 R; 296/1 S
[58] Field of Search ............ 180/7 J, 7 P, 7 R, 54 A; 296/1 S, 91; 60/597

[56] References Cited

U.S. PATENT DOCUMENTS

| | | | |
|---|---|---|---|
| 1,322,903 | 11/1919 | Hyland | 180/7 P |
| 1,346,993 | 7/1920 | Thompson | 180/7 P |
| 1,934,385 | 11/1933 | Strauss | 180/54 A |
| 2,612,964 | 10/1952 | Hobbs | 180/54 A |
| 3,819,000 | 6/1974 | Larsen | 180/54 A |
| 4,235,298 | 11/1980 | Sackett et al. | 180/54 A |

FOREIGN PATENT DOCUMENTS

| | | | |
|---|---|---|---|
| 62499 | 7/1944 | Denmark | 180/54 A |
| 602297 | 1/1932 | Fed. Rep. of Germany | 180/7 P |
| 56946 | 4/1924 | France | 180/54 A |

*Primary Examiner*—John A. Pekar
*Attorney, Agent, or Firm*—Charles L. Lovercheck; Wayne L. Lovercheck; Dale R. Lovercheck

[57] ABSTRACT

A duct system is disclosed for increasing the efficiency of a vehicle by decreasing the air resistance of the vehicle. The system utilizes a ducting system with a cowling at the front end and the back to equalize air pressure and to decrease turbulence in areas surrounding the vehicle. An engine driven fan provides air flow to equalize the air pressure in the ducts.

14 Claims, 3 Drawing Figures

SYSTEM TO INCREASE VEHICLE FUEL EFFICIENCY

GENERAL DESCRIPTION OF THE INVENTION

The greatest loss of vehicle fuel efficency results from two factors; (1) the air resistance of the vehicle and (2) poor thermal efficiency of internal or external combustion engines.

The system disclosed herein decreases the effective air resistance of the vehicle using ducting and cowling aided by the waste heat of the engine. As an object moves through the air, areas of positive and negative air pressure are developed in front and behind it. The engine's cooling fan is used in this disclosure to reduce the pressure differential. By ducting air from positive pressure areas to the intake area of the fan, and connecting the output of the fan to the negative pressure areas, the fan aids in reducing the effective air resistance of the vehicle. Cowlings are provided surrounding frontal and rear areas of the vehicle surface to separate areas of pressure developed by the air flow.

If the radiator and engine are placed between the fan and its output ducts, as air is pumped through the radiator and past the engine, the air pressure developed is increased by the excess engine heat. Extra pressure developed by scavenging the engine heat is ducted straight out the back, providing a jet assist to the forward movement of the vehicle thus the vehicle engine is assisted. The output ducts are provided with thermal insulation to prevent the loss of heat from the system.

REFERENCE TO PRIOR ART

Various structures have been provided to reduce turbulence and air resistance to vehicle movement but none of them have been completely satisfactory.

The following references have been noted; however, none of these references disclose the broad idea of channeling air through the vehicle body and over the cooling system of an internal combustion engine.

U.S. Pat. Nos. 1,648,505
2,199,883
2,232,275
2,725,944
3,437,371
3,516,707
3,529,862
3,836,191
3,910,632

OBJECTS OF THE INVENTION

It is an object of the invention to provide a vehicle body that has reduced air resistance.

Another object of the invention is to provide an improved vehicle body.

Another object of the invention is to provide an improved vehicle body that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF DRAWINGS

Figure 1:
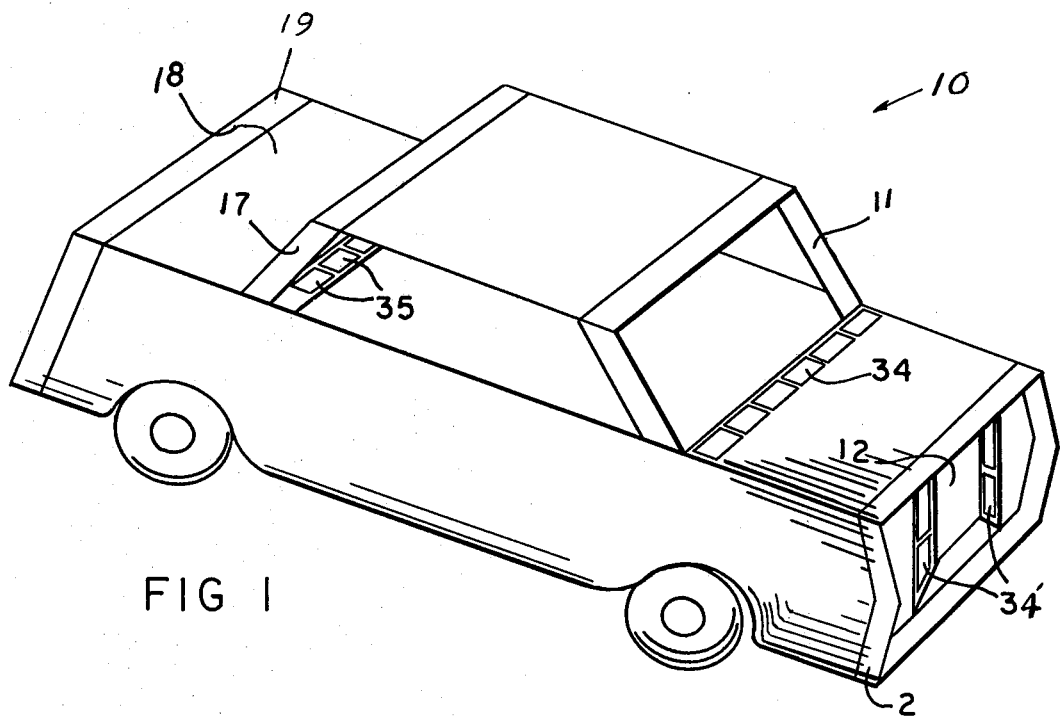
FIG. 1 is an isometric view of a vehicle body according to the invention.

Now, with more particular reference to the drawings. The drawings show diagrammatically an automobile vehicle body 10 which is designed to increase the fuel efficiency of the automobile. This automobile has cowling surrounding a windshield 11, a cowled grill 12, a fan 13, a radiator 14, an engine 15, cowls surrounding a rear window 17, cowlings surrounding a trunk or rear end 18 and an exhaust gas system 20. The cowling surrounding the windshield is constructed forwardly to separate the relatively high air pressure that is developed on the windshield from the air at lower pressure above and beside the vehicle as the vehicle moves forward. The cowling surrounding the trunk or the rear end of the vehicle is constructed rearwardly to separate the relatively low air pressure that is developed on the rear end of the vehicle from the air pressure at higher pressure above and beside the vehicle as the vehicle moves forward. The cowling surrounding the rear window is constructed rearwardly to separate the relatively low air pressure that is developed on the rear window from the air at higher pressure above and beside the vehicle as the vehicle moves forward. The cowling surrounding the grill or front end of the vehicle is constructed forwardly to separate the relatively high air pressure that is developed on the front end of the vehicle from the air at lower pressure above and beside the vehicle as the vehicle moves forward. An insulated main duct 16 extends under the body and terminates in the upwardly extending branch 28 which terminates in the branch 29, which directs air up into the low pressure area behind the rear window 17. The rearwardly extending branch 30 which directs air out into the low pressure area 31 behind the vehicle and the downwardly and rearwardly extending branch 32, which contains exhaust pipe 20 and terminates at nozzles 33. Air from the high pressure area 27 at the windshield enters duct 21' through openings 34, is forced through duct 21' where it joins air from cowled grill 12 at fan 13 and is urged by the fan through radiator 14.

Air exits from duct 30 to cowled area 19 at the rear of the vehicle and through the openings 35 in the low pressure area behind the rear window 17.

Figure 2:
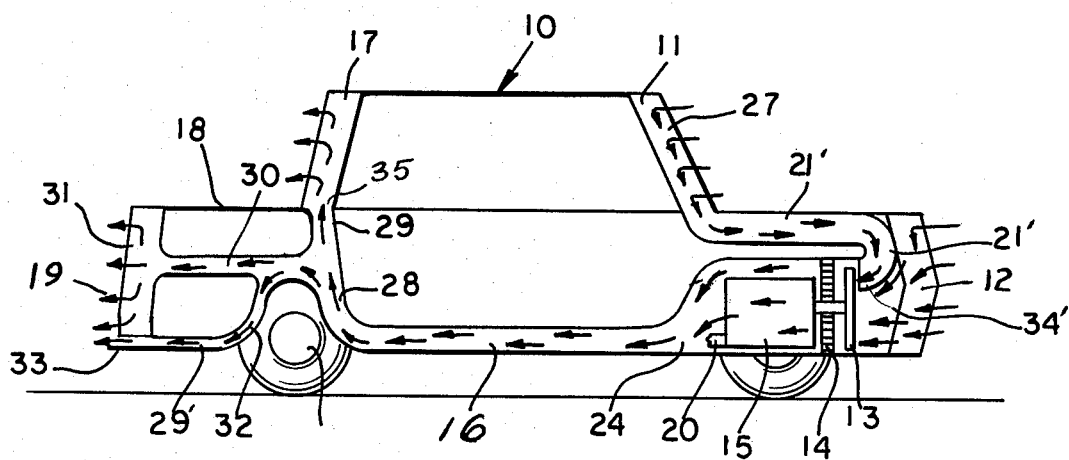
FIG. 2 shows a longitudinal cross sectional view through the vehicle body.
Figure 3:
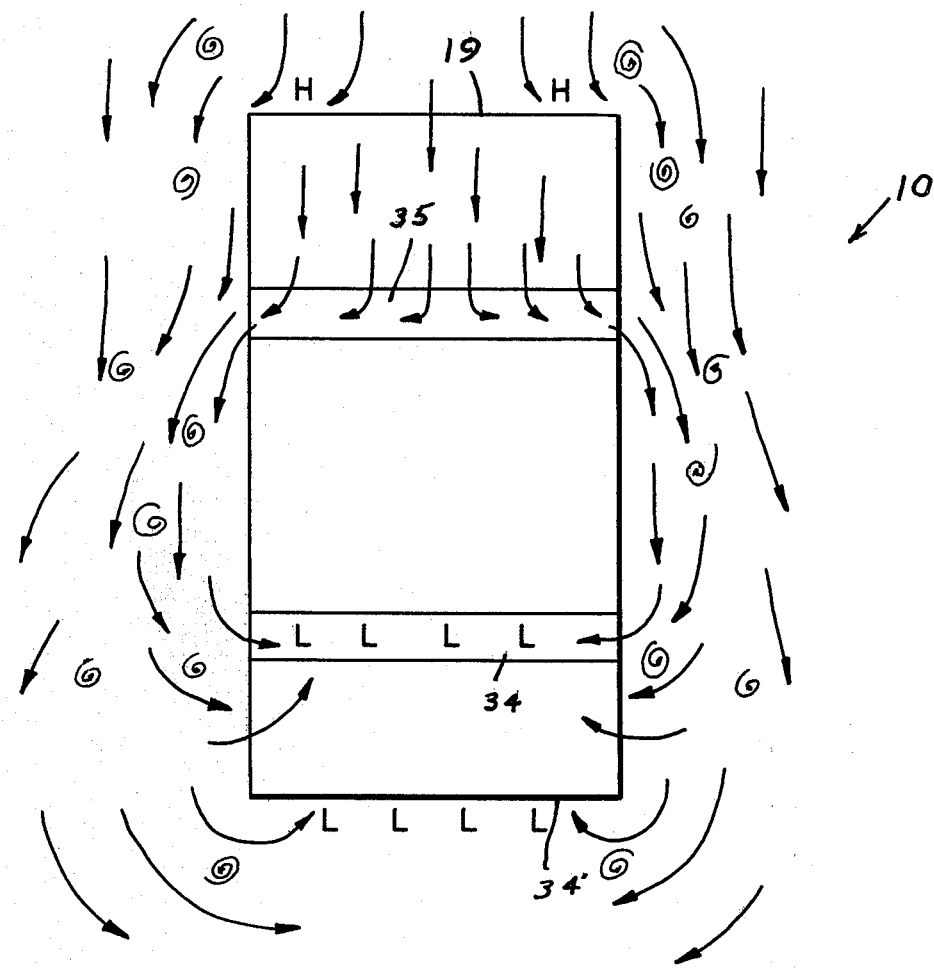
FIG. 3 shows a diagrammatic view showing the air flow around an unimproved vehicle.

FIG. 2 shows air direction of movement, as the vehicle moves, air which would normally build up in front of the vehicle is drawn in at cowled windshield area and through ducts 21' and cowled grill area 12 to the fan 13 and is moved by the fan 13. The air is pushed through the radiator 14 by means of the fan 13 and around the enclosed engine 15 in its compartment, expanding as it is heated by the radiator and engine. The exhaust gas system 20 is enclosed in the main duct 16 giving up its heat to the ducted air. The air passes through the main duct 16 to the rear where it is divided into three parts. A portion goes to the cowled rear window area 17, a portion to the low pressure cowled area 19 behind the trunk 18. The excess volume that was developed by heat scavenging being vented straight back from the rear of the vehicle through lines 29' to nozzles or air exits 33 thus providing forward push. Additionally, the engine exhaust gas system 20 is vented through the nozzles or air exits 33, aiding the push developed on the vehicle.

The fan may have variable driving means to adjust the air flow as required by vehicle speed, thermal energy developed, head or tail winds, and terrain.

Although an average passenger vehicle is shown, it should be understood that the system is also applicable, with modifications, to other types of vehicles such as a commercial vehicle for example, station wagons, vans, trucks, buses and tractor-trailers.

Utilization of smaller auxiliary ducts for passenger compartment heating and/or ventilation and to various points such as wheel wells, outside mirrors, etc., may be used upon an analysis of a given body design.

Valves (fluidic or mechanical) may be used in the ductwork to maximize the air flow balance under varying conditions of operation. Of course, the output ducts are insulated to retain the energy imparted by the engine heat.

The foregoing specification sets forth the invention in its preferred, practical forms but the structure shown is capable of modification within a range of equivalents without departing from the invention which is to be understood is broadly novel as is commensurate with the appended claims.

The embodiments of an invention in which an exclusive property or privilege is claimed are defined as follows:

1. A body (10) for an automobile adapted to increase the fuel efficiency of the automobile comprising,
a front end (12),
cowlings surrounding said front end being adapted to isolate a high pressure zone in front of said front end (12),
a fan (13),
a radiator (14),
an engine (15) providing propulsion of the vehicle,
a rear window,
cowlings surrounding the rear window (17) being adapted to isolate a low pressure zone behind said rear window,
a rear end (18),
cowlings (19) surrounding said rear end (18) being adapted to isolate a low pressure zone behind said rear end,
an exhaust gas system (20), and a passenger compartment
a windshield,
cowlings surrounding the windshield being adapted to isolate a high pressure zone in front of said windshield,
first duct means connecting the high pressure zones in front of said vehicle in fluid flow relation to said fan,
a second duct (16) on the vehicle extending from said fan (13) to the low pressure zones behind said vehicle,
air exit means,
said air exit means discharging air at the rear of said vehicle whereby in said front zones the pressure is decreased and in said rear zones the pressure is increased thereby reducing the resistance of the air pressure differential and assisting the engine to urge the vehicle forward.

2. The duct system recited in claim 1 wherein a first duct extends forwardly from below said windshield and over said engine and directs air from said high pressure zone in front of said windshield into the space in front of said fan.

3. The vehicle recited in claim 2 wherein said second duct extends from a space containing said engine rearwardly and terminates in said spaces behind said rear window and behind said rear end of said vehicle.

4. The vehicle recited in claim 3 wherein said vehicle has air exits at the rear of said vehicle connected to said second duct for supplying a jet assist force to said vehicle.

5. The vehicle recited in claim 3 wherein said exhaust pipe extends through said second duct and adds heat to said air.

6. The vehicle recited in claim 5 wherein heat from said radiator heats said air and increases air flow.

7. The vehicle recited in claim 1 wherein said second duct has heat insulation attached to the outside thereof to prevent the loss of heat added to said air by said radiator,
said exhaust and said engine.

8. The automotive vehicle recited in claim 1 wherein said fan has a variable speed drive to adjust the air flow as required by vehicle speed, thermal energy developed, head or tail wind and terrain.

9. An automotive vehicle having a body,
an internal combustion engine,
an exhaust system and a radiator adapted to increase the fuel efficiency thereof comprising,
a body having a windshield and a front end presenting areas which when the vehicle is in forward motion will develop relatively high pressure areas,
means to isolate the area of the windshield and the front end from a general airstream when the vehicle is in forward motion,
a body having a rear window and a rear end presenting areas which when the vehicle is in forward motion will develop relatively low pressure areas,
means to isolate the area of the rear window and the rear end from the general airstream when the vehicle is in forward motion,
a duct for air connecting said areas in front of said vehicle to said rear areas and enclosing said engine,
air exits at the rear end of said motor vehicle, whereby air from said areas in front of said windshield and in front of said vehicle flows over said engine, radiator and exhaust system to said rear areas and is discharged through said air exits whereby said relatively high pressure areas are reduced in pressure and said relatively low pressure areas are increased in pressure.

10. The vehicle recited in claim 9 wherein said exhaust system has an exhaust line which extends through said duct in fluid flow relationship to air flowing over said engine and said exhaust system.

11. The vehicle recited in claim 10 wherein said duct is connected to said rear area.

12. The vehicle recited in claim 11 wherein said exhaust extends through said duct from said engine that terminates adjacent the air exits at the rear of said duct.

13. The vehicle recited in claim 1 or 9 wherein said vehicle body has a passenger compartment and said duct is connected to said passenger compartment to provide heating and ventilating.

14. The vehicle recited in claim 1 or 9 wherein said duct comprises valves controlling the flow of air through the several parts of said duct.

* * * * *